(12) United States Patent
Baek et al.

(10) Patent No.: US 9,757,680 B2
(45) Date of Patent: Sep. 12, 2017

(54) SYSTEM AND METHOD FOR SEPARATION AND RECOVERY OF ACID GAS

(71) Applicant: KOREA INSTITUTE OF ENERGY RESEARCH, Daejeon (KR)

(72) Inventors: Il Hyun Baek, Daejeon (KR); Jong Kyun You, Daejeon (KR); Ki-Tae Park, Daejeon (KR)

(73) Assignee: KOREA INSTITUTE OF ENERGY RESEARCH, Daejeon (KR)

( * ) Notice: Subject to any disclaimer, the term of this patent is extended or adjusted under 35 U.S.C. 154(b) by 0 days.

(21) Appl. No.: 14/777,633

(22) PCT Filed: Dec. 9, 2013

(86) PCT No.: PCT/KR2013/011325
§ 371 (c)(1),
(2) Date: Sep. 16, 2015

(87) PCT Pub. No.: WO2015/083865
PCT Pub. Date: Jun. 11, 2015

(65) Prior Publication Data
US 2016/0296879 A1    Oct. 13, 2016

(30) Foreign Application Priority Data
Dec. 4, 2013 (KR) .................. 10-2013-0149944

(51) Int. Cl.
*B01D 53/14* (2006.01)
*B01D 53/18* (2006.01)

(52) U.S. Cl.
CPC ..... *B01D 53/1425* (2013.01); *B01D 53/1456* (2013.01); *B01D 53/1468* (2013.01);
(Continued)

(58) Field of Classification Search
CPC .... B01D 53/14; B01D 53/1425; B01D 53/14; B01D 53/1456; B01D 53/1468;
(Continued)

(56) References Cited

U.S. PATENT DOCUMENTS

2010/0229723 A1* 9/2010 Gelowitz ........... B01D 53/1425
95/162

FOREIGN PATENT DOCUMENTS

JP     2012-500713 A      1/2012
KR  10-2009-0008270 A    1/2009
(Continued)

OTHER PUBLICATIONS

International Search Report dated Sep. 1, 2014 of PCT/KR2013/011325 which is the parent application and its English translation—4 pages.
(Continued)

*Primary Examiner* — Duane Smith
*Assistant Examiner* — Cabrena Holecek
(74) *Attorney, Agent, or Firm* — Knobbe Martens Olson & Bear LLP

(57) ABSTRACT

Disclosed is a system and method of separating and collecting acid gas such as carbon dioxide in which the energy consumption in a stripping column for regenerating an absorbent may be reduced. In the system and method, the energy consumption may be reduced using heat generated during the acidic gas separation and collection processes. In the system and method, a low-temperature condensate from a condenser may be preheated by heat exchange with a high-temperature processed gas, and then supplied into the stripping column, thereby to reduce the heat duty of a reboiler and the energy consumption in the condenser for cooling. A partial flow of a carbon diode-absorbed absorbent from an absorber column may be preheated by heat
(Continued)

exchange with high-temperature processed gas from an upper portion of the stripping column, and then supplied into the stripping column, thereby to further reduce the heat duty of the reboiler.

8 Claims, 1 Drawing Sheet

(52) U.S. Cl.
CPC ......... *B01D 53/1475* (2013.01); *B01D 53/18* (2013.01); *B01D 2257/304* (2013.01); *B01D 2257/306* (2013.01); *B01D 2257/308* (2013.01); *B01D 2257/504* (2013.01); *B01D 2259/65* (2013.01); *Y02C 10/06* (2013.01)

(58) Field of Classification Search
CPC .... B01D 53/1475; B01D 53/18; Y02C 10/04; Y02C 10/06
See application file for complete search history.

(56) References Cited

FOREIGN PATENT DOCUMENTS

| | | |
|---|---|---|
| KR | 10-2010-0092967 A | 8/2010 |
| KR | 10-0983677 B1 | 9/2010 |
| KR | 10-2012-0029523 A | 3/2012 |
| KR | 10-2013-0023484 A | 3/2013 |

OTHER PUBLICATIONS

Park, "Carbon Dioxide Capture and Storage Technology", Physics and Advanced Technologies, Jun. 2009, pp. 19-23.

* cited by examiner

Fig. 1  -Prior Art-
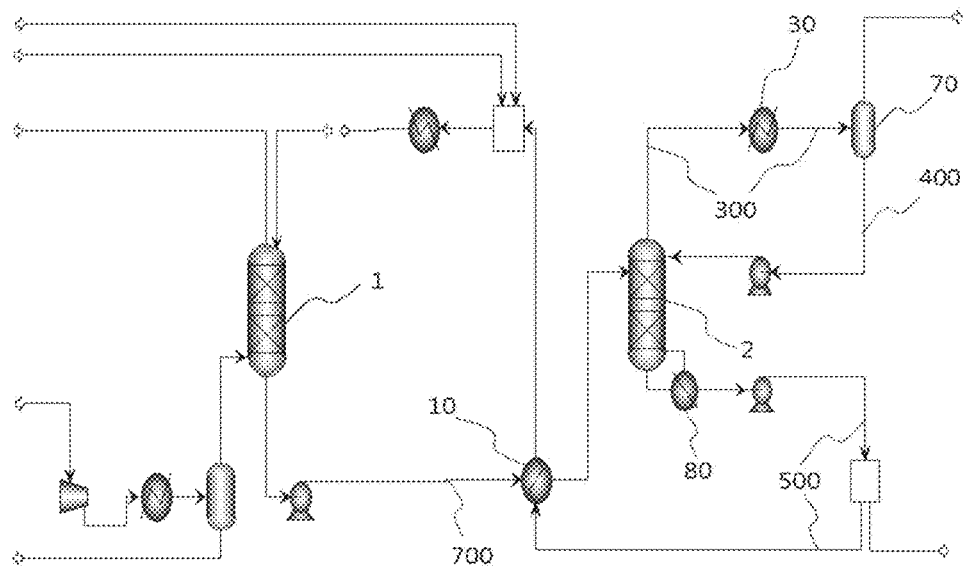
Fig. 2
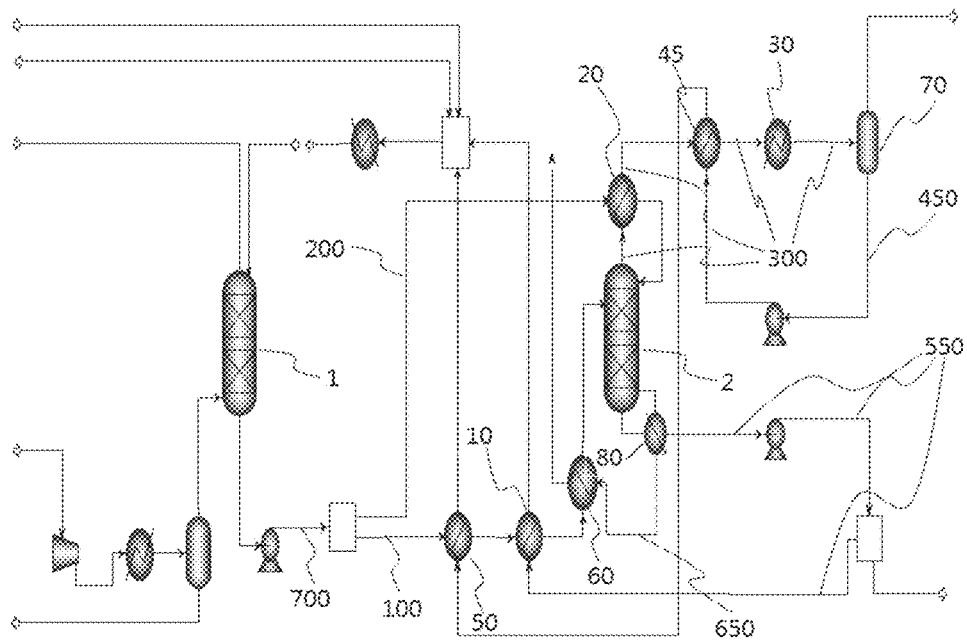

SYSTEM AND METHOD FOR SEPARATION AND RECOVERY OF ACID GAS

TECHNICAL FIELD

The present disclosure relates to a system of separating and collecting acidic gas such as carbon dioxide, and more particularly, to a system and method for separation and recovery of acid gas, which may reduce the heat duty of a stripping column for generating a recycle absorbent from an acidic gas-absorbed absorbent.

BACKGROUND ART

The concentration increase of acidic gas such as carbon dioxide ($CO_2$), methane ($CH_4$), hydrogen sulfide ($H_2S$), carbonyl sulfide (COS) or the like in the air from increasing use of fossil fuel is causing global warming. In particular, reducing the concentration of carbon dioxide in the air has been actively discussed worldwide in various aspects since the Rio de Janeiro environment conference in 1992.

Carbon dioxide capture and storage (CCS) technologies are isolating carbon dioxide discharged in large quantity from power plants, steel plants or cement plants from the air.

In particular, carbon dioxide capture in CCS technologies is considered a core technology that takes about 70% to about 80% of the overall cost, which may be classified into post-combustion technology, pre-combustion technology, and oxy-fuel combustion technology (refer to "Carbon Dioxide Capture and Storage Technology", by Sang-do Park, Physics and Advanced Technologies, June, 2009).

Post-combustion technology is isolating carbon dioxide ($CO_2$) that is produced from combustion of fossil fuel by absorbing or reacting carbon dioxide ($CO_2$) with various solvents. Pre-combustion technology is capturing carbon dioxide ($CO_2$) in exhaust gas before combustion by pre-treating fossil fuel such as coal, for example, via gasification into carbon dioxide ($CO_2$) and hydrogen ($H_2$), and then isolating carbon dioxide($CO_2$) from the mixed gas of carbon dioxide ($CO_2$) and hydrogen ($H_2$) or combusting the mixed gas. Oxy-fuel combustion technology is combusting fossil fuel with only pure oxygen instead of air, thereby to easily capture carbon dioxide ($CO_2$). Post-combustion technology of the above-described technologies is currently most widely used.

Post-combustion technology is the most easy to apply with existing carbon dioxide sources, which separates carbon dioxide by adsorbing or desorbing carbon dioxide with absorbent, focusing on performance improvement of the absorbent and process improvement therefor. This post-combustion technology includes wet absorption and dry absorption methods that are currently in commercial use to supply carbon dioxide in welding process or producing urea fertilizer or carbonated drink. Wet absorption methods are higher in efficiency than dry absorption methods A typical wet absorption process is a capture process using amine-based absorbent. This process has been used in a modification process involved in petrochemical processes with ensured technical reliability, but still needs further improvement in terms of absorbent performance and process improvement in order to be applicable with flue gas including various contaminants. As a process using amine-based absorbent, a chemical absorption process using an alkanolamine absorbent that includes both amine and hydroxyl groups on an alkyl group may be performed using a system equipped with an absorber column for selectively absorbing carbon dioxide from flue gas, a stripping column for processing the carbon dioxide-absorbing absorbent to regenerate the initial carbon dioxide-lean absorbent for recycling, and other accessory equipments.

Monoethanolamine (MEA), as a most widely used amine-based absorbent, has alkaline properties due to unshared electrons in amine groups, which may cause acid-base neutralization reaction with acidic carbon dioxide. Furthermore, salts (carbamate or bicarbonate) as a reaction product may be decomposed at a temperature of about 110° C. to about 130° C. to regenerate the absorbent. The carbon dioxide (CO2) absorbing capability and absorption rate of an absorbent may much differ depending on the structural characteristics of amines used as the absorbent.

A carbon dioxide absorption process may be performed at about 40° C. to about 50° C., while a recycling process may be performed at about 110° C. to about 130° C. Accordingly, part of the absorbent may vaporize during the recycling process and be discharged together with carbon dioxide. In this regard, there is a need for heat integration technologies to reduce the heat duty of such as a cooler for cold condensation and a reboiler that are used in the recycling process.

Korean Patent No. 0983677 relates to a system and method of absorbing and separating acidic gas, wherein using steam generated in a boiler as a heat source for recycling absorbent is disclosed. However, using the generated steam only for absorbent recycling still has limitations.

Therefore, there is a need for the development of technologies to reduce the energy consumption for heating and cooling in the recycling process.

PRIOR ART DOCUMENTS

Patent Document (Patent document 1) (0001) Korean Patent No. 0983677

Non-Patent Document (Non-patent document 1) (0001) "Carbon Dioxide Capture and Storage Technology", by Sang-do Park, Physics and Advanced Technologies, June, 2009

DETAILED DESCRIPTION OF THE INVENTION

Technical Problem

To address these drawbacks of the prior art, the present invention provides a system and method of separating and collecting acidic gas, which reduce the energy consumption by using heat integration in the system.

Technical Solution

To address the drawbacks of the prior art, the present inventors found that energy efficiency can be improved by increasing the temperature of low-temperature condensate water discharged from a condenser through cold condensation, by heat exchange with a processed gas discharged from a stripping column, preheating part of an acidic gas-absorbed absorbent that is to be supplied to the stripping column with the heat energy of the condensate water, and preheating the remaining part of the acidic gas-absorbed absorbent by heat exchange with the processed gas, and consequentially completed the present invention.

According to an aspect of the present disclosure, there is provided a system of separating and collecting acidic gas, in which an absorber column absorbs the acidic gas as an absorbent to obtain an acidic gas-absorbed absorbent, and a stripping column separates the acidic gas from recycle absorbent using a processed gas, the system including:

first to sixth heat exchangers;

a branched absorbent supply line including a first absorbent supply line that supplies the acidic gas-absorbed absorbent from the absorber column to the stripping column via the fifth heat exchanger, the first heat exchanger, and the sixth heat exchanger; and a second absorbent supply line that supplies the acidic gas-absorbed absorbent to the stripping column via the second heat exchanger;

a processed gas transfer line that supplies the processed gas discharged from the stripping column to a condenser via the second heat exchanger, the fourth heat exchanger, and then the third heat exchanger;

a reboiler that heats the recycle absorbent having low temperature supplied from the stripping column;

a reboiler's condensate discharge line that supplies a condensate discharged from the reboiler to the sixth heat exchanger;

a recycle absorbent transfer line that supplies a high-temperature recycle absorbent discharged from the reboiler to the absorber column via the first heat exchanger; and a condensate supply line that supplies the condensate for recycling from the condenser to the absorber column via the fourth heat exchanger and then the fifth heat exchanger, wherein the second absorbent supply line and a portion of the processed gas transfer line that passes through the stripping column intersect with each other in the second heat exchanger, a portion of the processed gas transfer line that passes through the second heat exchanger, and the condensate supply line intersect with each other in the fourth heat exchanger, a portion of the condensate supply line that passes through the fourth heat exchanger, and the first absorbent supply line intersect with each other in the fifth heat exchanger, and the reboiler's condensate discharge line and a portion of the first absorbent supply line that passes through the fifth heat exchanger and the first heat exchanger intersect with each other in the sixth heat exchanger.

In some embodiments of the system, an operating temperature of the condenser may be in a range of about 30° C. to about 40° C.

In some embodiments of the system, the acidic gas may be carbon dioxide ($CO_2$), methane ($CH_4$), hydrogen sulfide ($H_2S$), carbonyl sulfide (COS), or mercaptane (RSH, where R is a hydrocarbon).

In some embodiments of the system, the first absorbent supply line, and absorbent supply line that transfers the recycle absorbent to the absorber column via the reboiler connected to a lower portion of the stripping column may intersect with each other in the first heat exchanger.

According to another aspect of the present disclosure, a method of separating and collecting acidic gas includes:

supplying an exhaust gas that includes an acidic gas to an absorber column to is absorb the acidic gas into an absorbent, thereby to obtain an acidic gas-absorbed absorbent;

supplying a first portion of the acidic gas-absorbed absorbent discharged from the absorber column to a stripping column, and supplying a second portion of the acidic gas-absorbed absorbent to the stripping column after preheating through thermal exchange with a processed gas discharged out of the stripping column, thereby to separate the acidic gas-absorbed absorbent into the absorbent and the acidic gas in the stripping column;

preheating the processed gas that underwent heat exchange with the second portion of the acidic gas-absorbed absorbent after discharged out of the stripping column, by thermal exchange with a condensate produced in a condenser by cold condensation before the processed gas is supplied into the condenser for cold condensation, and then preheating the first portion of the acidic gas-absorbed absorbent;

supplying the processed gas discharged from the stripping column to a condenser after heat exchange with a condensate previously discharged from the condenser and then with the second portion of the acidic gas-absorbed absorbent;

preheating the condensate that underwent the heat exchange with the second portion of the acidic gas-absorbed absorbent, by heat exchange with the first portion of the acidic gas-absorbed absorbent; and preheating the preheated first portion of the acidic gas-absorbed absorbent by thermal exchange with a condensate produced in a reboiler that is connected to a lower portion of the stripping column.

In some embodiments of the method, an operating temperature of the condenser may be in a range of about 30° C. to about 40° C.

In some embodiments of the method, the acidic gas may be carbon dioxide ($CO_2$), methane ($CH_4$), hydrogen sulfide ($H_2S$), carbonyl sulfide (COS), or mercaptane (RSH, where R is a hydrocarbon).

In some embodiments of the method, the first portion of the acidic gas-absorbed absorbent may be preheated by heat exchange with a recycle absorbent discharged from the reboiler that is connected to a lower portion of the stripping column.

Advantageous Effects

As described above, in a system and method of separating and collecting acidic gas according to any of the one or more embodiments, a high-temperature recycle condensate obtained through heat exchange with high-temperature processed gas discharged from an upper portion of a stripping column may be used to preheat an acidic gas-absorbed absorbent that is to be supplied into the stripping column. The acidic gas-absorbed absorbent that is to be supplied into the stripping column may be further preheated before supplied into the stripping column, by heat exchange in a heat exchanger with a high-temperature condensate that is generated as the heat of steam as a thermal medium for heating an absorbent solution in a reboiler is lost by the recycle absorbent solution. Accordingly, the heat duty of the reboiler may be reduced.

DESCRIPTION OF THE DRAWINGS

FIG. 1 illustrates a conventional system of separating and collecting acidic gas; and FIG. 2 illustrates a system of separating and collecting acidic gas, according to an embodiment of the present disclosure.

EMBODIMENTS

One or more embodiments of a system and method of separating and collecting acidic gas now will be described more fully hereinafter with reference to the accompanying drawings, in which illustrative embodiments of the invention are shown. However, this invention should not be construed as limited to the embodiments set forth herein, and may be embodied in many different forms without departing from the principles and spirit of the invention, the scope of which is defined in the claims and their equivalents.

In the drawings illustrating embodiments of the present invention, like numbers refer to like elements throughout, and detailed description of the same or like elements are not repeated.

Unless otherwise defined, all terms including technical and scientific terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Absorbent, processed gas, or condensate transfer lines that may exchange heat with one another are described herein as "intersecting with each other" in a heat exchanger for heat exchanging. In other words, two of these fluid transfer lines may intersect with each other in a heat exchanger to exchange heat with each other.

FIG. 1 illustrates a conventional system for separating and collecting acidic gas. In the conventional system of FIG. 1, an exhaust gas that contains an acidic gas such as carbon dioxide is supplied into an absorber column 1 that is filled with filling matter having a large surface area to facilitate contact between gas and liquid, and thereby to contact the exhaust gas with an absorbent solution that is sprayed above the absorber column 1 under an atmospheric condition. The contact is performed at a temperature of about 40° C. to about 50° C. to absorb the acidic gas such as carbon dioxide present in the exhaust gas into the absorbent solution.

The absorbent solution discharged from the absorber column 1, i.e., the absorbent in which the acidic gas such as acidic gas is absorbed, is transferred to a stripping column 2, and then thermally treated at a temperature of about 120° C. to obtain a processed gas that is free of the absorbent. Then, the processed gas free of the absorbent is discharged through an upper portion of the stripping column 2, while the recycle absorbent free of the processed gas is recycled by being supplied back to the absorber column 1 via a reboiler 80. The processed gas discharged out of the stripping column 2 is supplied to a condenser 70 through a processed gas discharge line 300. The condenser 70 condenses part of steam into water so that the steam remaining uncondensed and acidic gas such as carbon dioxide are obtained as final products. The condensate is supplied back into the stripping column 2 through a condensate supply line 400 for recycling. The recycling of the condensate may improve the separation efficiency of the stripping column 2 but may also increase the heat duty of the reboiler 80 due to the inflow of the low-temperature condensate. The recycle absorbent is transferred through a recycle absorbent supply line 500 to preheat the acidic gas-absorbed absorbent that is to be supplied into the stripping column 2 through the first heat exchanger 10, and to be supplied back to absorber column 1 in order to absorb newly supplied acidic gas. The recycle absorbent supply line 500 and an absorbent supply line 700 for supplying the acidic gas-absorbed absorbent from the absorber column 1 to the stripping column 2 intersect with each other in the first heat exchanger 10.

FIG. 2 illustrates a system for separating and collecting acidic gas according to an embodiment of the present disclosure. The system of FIG. 2 includes an absorber column 1 that absorbs acidic gas into an absorbent to obtain an acidic gas-absorbed absorbent, and a stripping column 2 that separates the absorbent as a recycle absorbent from a processed gas, The system of FIG. 2 includes; a branched absorbent supply line 700 including a first absorbent supply line 100 that may supply the acidic gas-absorbed absorbent from the absorber column 1 to the stripping column 2 via a fifth heat exchanger 50, a first heat exchanger 10, and a sixth heat exchanger 60; and a second absorbent supply line 200 that may supply the acidic gas-absorbed absorbent to the stripping column 2 via a second heat exchanger 20; a processed gas transfer line 300 that may supply the processed gas discharged from the stripping column 2 to a condenser 70 via the second heat exchanger, a fourth heat exchanger, then a third heat exchanger; a reboiler 80 that may heat the recycle absorbent having low temperature supplied from the stripping column 2; a reboiler's condensate discharge line 650 that may supply a condensate discharged from the reboiler 80 to the sixth heat exchanger 60; a recycle absorbent transfer line 550 that may supply a high-temperature recycle absorbent discharged from the reboiler 80 to the absorber column 1 via the first heat exchanger 10; and a condensate supply line 450 that may supply the condensate for recycling from the condenser 70 to the absorber column 1 via the fourth heat exchanger 45 and then the fifth heat exchanger 50.

In the system of FIG. 2, the second absorbent supply line 200 and a portion of the processed gas transfer line 300 that passes through the stripping column 2 intersect with each other in the second heat exchanger 20, a portion of the processed gas transfer line 300 that passes through the second heat exchanger 20, and the condensate supply line 450 intersect with each other in the fourth heat exchanger 45, a portion of) the condensate supply line 450 that passes through the fourth heat exchanger 45, and the first absorbent supply line 100 intersect with each other in the fifth heat exchanger 50, and the reboiler's condensate discharge line 650 and a portion of the first absorbent supply line 100 that passes through the fifth heat exchanger 50 and the first heat exchanger 10 intersect with each other in the sixth heat exchanger 60.

In the conventional system of FIG. 1, the operating pressure and temperature of the reboiler 80 may be about 2 bar and about 120° C., respectively. However, in the system of FIG. 2, a thermal medium for heating an absorbent solution in the reboiler 80 may be steam having a temperature of about 135° C. or higher. The steam may provide latent heat to heat the absorbent solution in the reboiler 80, and may be discharged out of the system as condensate via condensation.

The temperature of the condensate may be about 130° C. or higher that is high enough for heat recovery. This high-temperature condensate may be used to heat the absorbent solution that passed through the fifth heat exchanger 50 and the first heat exchanger 10 before the absorbent solution is supplied into the stripping column 2, so that the heat duty of the reboiler 80 may be reduced.

A flow of the processed gas that passes through the upper portion of the stripping column 2 may include a considerable amount of high-temperature steam. Accordingly, the heat energy consumption may be reduced by recovering heat from the high-temperature processed gas. In some embodiments, in the process system of FIG. 2 the second heat exchanger 20 may be disposed above the upper portion of the stripping column 2 to allow thermal exchange between the high-temperature processed gas and a flow of the absorbent in which acidic gas such as carbon dioxide is absorbed, from the absorber column 1 through the second absorbent supply line 200 of the branched absorbent supply line 700, thereby further heating the flow of the acidic gas-absorbed absorbent that is to be supplied into the stripping column 2. Accordingly, the heat duty of the reboiler 80 may be reduced.

In some embodiments, the operating temperature of the condenser 70 may be in is a range of about 30° C. to about 40° C. In some embodiments, the acidic gas may be selected from carbon dioxide ($CO_2$), methane ($CH_4$), hydrogen sulfide ($H_2S$), carbonyl sulfide (COS), or mercaptane (RSH, where R is a hydrocarbon), but is not limited thereto. In some embodiments, the first absorbent supply line 100 and the absorbent transfer line 650 that transfers the recycle absorbent from the stripping column 2 to the absorption column 1 via the reboiler 80 connected to a lower portion of the stripping column 2 may intersect with each other in the first heat exchanger 10, so that the absorbent transferred through the first absorbent supply line 100 may be preheated in the first heat exchanger 10.

According to another aspect of the present disclosure, a method of separating and collecting acidic gas includes: supplying an exhaust gas that includes an acidic gas to an absorber column to absorb the acidic gas into an absorbent; supplying a first portion of the acidic gas-absorbed absorbent discharged from the absorber column to a stripping column, and supplying a second portion of the acidic gas-absorbed absorbent to the stripping column after preheating through thermal exchange with a processed gas discharged out of the stripping column, thereby to separate the acidic gas-absorbed absorbent into the absorbent and the acidic gas in the stripping column; preheating the processed gas that underwent heat exchange with the second portion of the acidic gas-absorbed absorbent after discharged out of the stripping column, by thermal exchange with a condensate produced in a condenser by cold condensation before the processed gas is supplied into the condenser for cold condensation, and then preheating the first portion of the acidic gas-absorbed absorbent; supplying the processed gas discharged from the stripping column to a condenser after heat exchange with a condensate previously discharged from the condenser and then with the second portion of the acidic gas-absorbed absorbent; preheating the condensate that underwent the heat exchange with the second portion of the acidic gas-absorbed absorbent, by heat exchange with the first portion of the acidic gas-absorbed absorbent; and preheating the preheated first portion of the acidic gas-absorbed absorbent by thermal exchange with a condensate produced in a reboiler that is connected to the stripping column.

LIST OF REFERENCE NUMERALS

1: absorber column
2: stripping column
10: first heat exchanger
20: second heat exchanger
30: third heat exchanger
45: fourth heat exchanger
50: fifth heat exchanger
60: sixth heat exchanger
70: condenser
100: first absorbent supply line
200: second absorbent supply line
300: processed gas discharge line
400: condensate supply line
500: recycle absorbent transfer line
650: reboiler's condensate discharge line

The invention claimed is:

1. A system for separating and collecting acidic gas, the system comprising an absorber column and a stripping column, wherein the absorber column is configured to process the acidic gas using an absorbent contained therein, wherein the stripping column is configured to separate the acidic gas from the absorbent which is transferred from the absorber column to the stripping column, the system further comprising:

first to sixth heat exchangers;
a branched absorbent supply line comprising a first absorbent supply line and a second absorbent supply line, wherein the first absorbent supply line configured to transfer a first portion of the absorbent with the acidic gas to the stripping column via the fifth heat exchanger, the first heat exchanger and the sixth heat exchanger, wherein the second absorbent supply line is configured to transfer a second portion of the absorbent with the acidic gas to the stripping column via the second heat exchanger,
a processed gas transfer line configured to transfer processed gas discharged from the stripping column to a condenser via the second heat exchanger, the fourth heat exchanger, and then the third heat exchanger;
a reboiler configured to heat a recycle absorbent supplied from the stripping column;
a reboiler's condensate discharge line configured to transfer a first condensate discharged from the reboiler to the sixth heat exchanger;
a recycle absorbent transfer line configured to transfer heated recycle absorbent discharged from the reboiler to the absorber column via the first heat exchanger; and
a condensate supply line configured to transfer a second condensate for recycling from the condenser to the absorber column via the fourth heat exchanger and the fifth heat exchanger,
wherein the second absorbent supply line and the processed gas transfer line are configured to heat-exchange with each other in the second heat exchanger,
wherein the processed gas transfer line and the condensate supply line are configured to heat-exchange with each other in the fourth heat exchanger,
wherein the condensate supply line and the first absorbent supply line are configured to heat-exchange with each other in the fifth heat exchanger, and
wherein the reboiler's condensate discharge line and the first absorbent supply line are configured to heat-exchange with each other in the sixth heat exchanger.

2. The system of claim 1, wherein an operating temperature of the condenser is in a range of about 30° C. to about 40° C.

3. The system of claim 1, wherein the acidic gas comprises carbon dioxide (CO2), methane (CH4), hydrogen sulfide (H2S), carbonyl sulfide (COS), or mercaptan (RSH, where R is a hydrocarbon).

4. The system of claim 1, wherein the first absorbent supply line and the recycle absorbent transfer line are configured to heat-exchange with each other in the first heat exchanger.

5. A method of separating and collecting acidic gas, the method comprising:
supplying an exhaust gas that includes an acidic gas to an absorber column to absorb the acidic gas into an absorbent, thereby to obtain an acidic gas-absorbed absorbent;
supplying a first portion of the acidic gas-absorbed absorbent discharged from the absorber column to a stripping column through a first absorbent line, and a second portion of the acidic gas-absorbed absorbent to the stripping column through a second absorbent line;

processing, at the stripping column, the acidic gas-absorbed absorbent received through the first and second absorbent lines to separate processed gas and a recycle absorbent for discharging the processed gas toward a condenser and the recycle absorbent toward a reboiler;

processing, at a condenser, the processed gas to separate condensed water and acidic gas;

heating the second portion of the acidic gas-absorbed absorbent, which comprises heat-exchanging the second portion of the acidic gas-absorbed absorbent with the processed gas discharged out of the stripping column;

heating the condensed water, which comprises heat-exchanging the condensed water from the condenser with the processed gas; and heating the first portion of the acidic gas absorbed absorbent, which comprises heat-exchanging the first portion of the acidic gas-absorbed absorbent with the condensed water that was heat-exchanged with the processed gas.

6. The method of claim 5, wherein an operating temperature of the condenser is in a range of about 30° C. to about 40° C.

7. The method of claim 5, wherein the acidic gas comprises carbon dioxide ($CO_2$), methane ($CH_4$), hydrogen sulfide ($H_2S$), carbonyl sulfide (COS), or mercaptan (RSH, where R is a hydrocarbon).

8. The method of claim 5, further comprising heating the first portion of the acidic gas-absorbed absorbent, wherein heating comprises heat-exchanging the first portion of the acidic gas-absorbed absorbent with the recycle absorbent discharged from the reboiler that is connected to a lower portion of the stripping column.

* * * * *